(12) United States Patent
Cordaro et al.

(10) Patent No.: US 10,038,469 B1
(45) Date of Patent: Jul. 31, 2018

(54) SYSTEM AND METHOD OF TETHERING FOR REMOTE DC LOGIC CONTROL

(71) Applicant: Verizon Patent and Licensing Inc., Basking Ridge, NJ (US)

(72) Inventors: Nicholas James Cordaro, Flemington, NJ (US); Pi-Yang Brian Liao, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/468,062

(22) Filed: Mar. 23, 2017

(51) Int. Cl.
*H04M 1/00* (2006.01)
*H04B 1/401* (2015.01)
*H04B 3/54* (2006.01)
*H04B 1/52* (2015.01)

(52) U.S. Cl.
CPC .............. *H04B 1/401* (2013.01); *H04B 1/52* (2013.01); *H04B 3/548* (2013.01)

(58) Field of Classification Search
CPC .............. H01Q 1/246; H04B 1/44; H04B 7/02
USPC ........................................ 455/562.1
See application file for complete search history.

(56) References Cited

U.S. PATENT DOCUMENTS

| | | | |
|---|---|---|---|
| 2008/0204318 A1* | 8/2008 | Thomas ................. | H01Q 1/246 342/361 |
| 2010/0144289 A1* | 6/2010 | Haskell .................. | H01Q 1/246 455/83 |
| 2010/0279730 A1* | 11/2010 | Ortiz ..................... | H04B 1/0057 455/550.1 |
| 2016/0352002 A1* | 12/2016 | Aue ....................... | H01Q 1/246 |
| 2017/0257207 A1* | 9/2017 | Kim ....................... | H04L 5/143 |

* cited by examiner

*Primary Examiner* — Simon Nguyen

(57) ABSTRACT

Output from a plurality of radios is received at input ports of a combiner, combined and carried over a coaxial line to a receiver. A DC current is detected entering one of the input ports. The input port in which DC current was detected is assigned as a DC I/O port, and an identity of the assigned DC I/O port is wireless transmitted to the receiver. The receiver separates a DC current from the combined signals received over the coaxial transmission line. The receiver, based on the wireless transmitted identity of the assigned DC I/O port, routes separated DC current to a receiver I/O port corresponding to the identity of the assigned DC I/O port.

20 Claims, 6 Drawing Sheets

SYSTEM AND METHOD OF TETHERING FOR REMOTE DC LOGIC CONTROL

BACKGROUND

Antennas are often designed to be directional, and must be correctly pointed or aimed when installed. Therefore, mounts for attaching antenna to fixed structures, such as buildings or cell towers, can provide power-actuated steering adjustment. The adjustments can include power actuated steering adjustment to the antenna mounts, and can include power-actuated adjustment to a "remote electrical tilt" or "RET" motor/actuator located inside the antenna. The RET motor/actuator can change the phase of each antenna element, causing the antenna-beam to "tilt" without tilting the physical antenna. The power actuated adjustment, though, can require delivery of direct current (DC). A complication is that antenna masts often support a plurality of antennas, fed by a corresponding plurality of radios located, for example, at the base of the antenna mast. Providing a dedicated transmission line, e.g., coaxial cable for each and every one of the radios to feed its corresponding antenna(s) is generally not practicable. Therefore, a particular multiplexing can be employed, using combiners and de-combiners, to put all of the radio feeds onto a common coaxial cable.

The multiplexing techniques, however, can complicate adjustment of the multiple antennas. A reason is that DC current delivery techniques, for providing DC current to the adjustment mechanism of a given radio's antenna include inserting DC current into the multiplexer input port that is normally fed by the radio. A technique to avoid the DC current from interfering with other radios and other antennas is to insert DC block devices known as "DC blocks" into all of the feed ports, at the antenna base and at the antenna mast top, except for the port feeding the antenna for which adjustment is desired. The present technique is time consuming, costly, dangerous and is prone to error. For example, installing the DC blocks at the antenna mast top requires a technician to climb the antenna mast to the antenna top. This requires significant resources, time and money.

A solution for providing DC current, through multiplexed antenna feeds, to a desired antenna mechanism without causing current to flow into other radios or to other antenna faces, and without requiring climbing antenna masts is needed.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

One example disclosed apparatus can include a wireless transmitter and an N:1 radio frequency (RF) combiner, including N RF input/output (I/O) ports and a combined RF I/O port. The N may be an integer greater than one. The apparatus may also include a direct current (DC) sense logic configured to identify, as a DC I/O port, one of the RF I/O ports receiving a DC signal. In an implementation, a controller can be coupled to the wireless transmitter and to the DC sense logic, and can be configured to respond to the DC sense logic identifying the DC input port by causing the DC signal to combine with an output of the combined RF I/O port, and the wireless transmitter to wireless transmit an identity of the DC I/O port.

In an implementation, N RF/DC separators can be included, each including a separated RF port coupled to a corresponding one of the RF I/O ports of the N:1 RF combiner, and each further including a composite signal input port and a separated DC signal line. In an aspect, the DC sense logic can be further configured to receive the plurality of separated DC signal lines and identify which carries the DC signal, and identify the DC I/O port as the RF I/O port associated with the separated DC signal line carrying the DC signal.

One example disclosed method can include receiving signals at each of a plurality of input ports, combining the signals into a combination signal, and transmitting the combination signal over a coaxial line to a receiver. The method also includes detecting a DC entering one of the input ports; assigning the input port in which DC current was detected as an assigned DC I/O port; and wireless transmitting an identity of the assigned DC I/O port to a receiver. In an aspect, the method can further include separating, at the receiver, a DC current from the combined signals received over the coaxial transmission line and, based on the identity of the assigned DC I/O port, routing at the receiver the separated DC current to a receiver I/O port corresponding to the identity of the assigned DC I/O port.

Another example disclosed method can include receiving RF outputs from N radios, at a corresponding N RF I/O ports, N being an integer, combining the N RF signals into a combined RF signal, detecting a DC current entering one of N RF I/O ports and, in response, combining a separation of the DC current entering the one of N RF I/O with the combined RF signal; and wireless transmitting an identity of the one of the N RF I/O ports.

Figure 1:
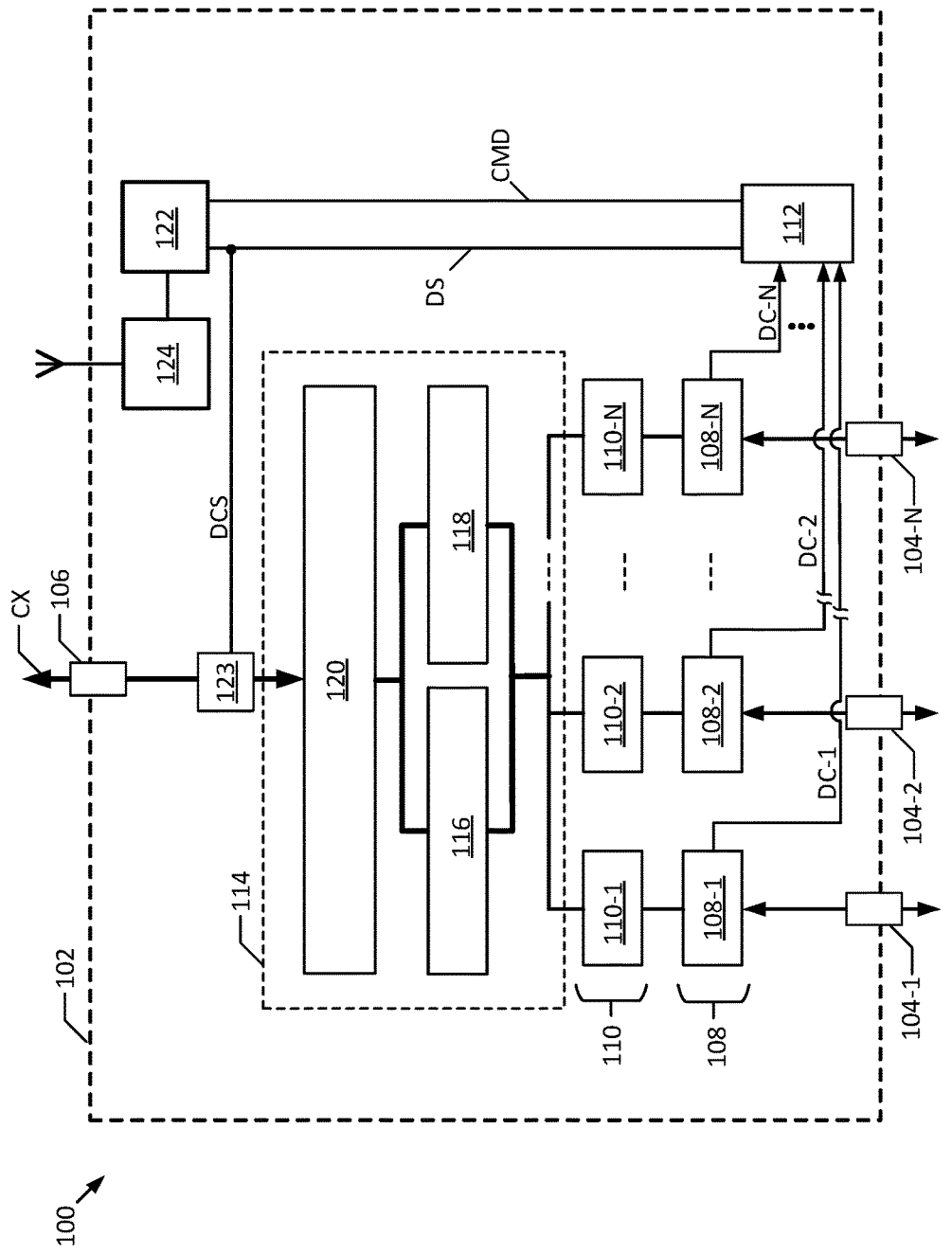
FIG. 1 illustrates a diagram of an example configuration of an assignable DC pass I/O port combiner/de-combiner (CBD) according to one or more aspects of this disclosure.

FIG. 1 illustrates a functional block diagram of one implementation of an assignable DC port combiner/de-combiner (CBD) 100 according to various aspects of this disclosure. The assignable DC port CBD 100 can include a housing 102, configured to support a population of N RF band I/O connectors, such as the illustrated first RF band I/O connector 104-1, second RF band I/O connector, 104-2, . . . , and Nth RF band connector 104-N, collectively referenced as "RF band I/O connectors 104." It will be understood that implementations can include N being two, in which case the Nth RF band connector 104-N is omitted. The housing 102 can be configured to also support a combined RF I/O connector 106. Each of the RF band I/O connectors 104 can couple, for example by a coaxial cable, to a corresponding transmit/receive port of an RF radio (not visible in FIG. 1). The combined RF I/O connector 106 can couple to a coaxial transmission line CX that can couple, at its distal end (not visible in FIG. 1), for example through another combiner/de-combiner, to a plurality of antennas, as described in greater detail later.

In example operations, each of the RF band I/O connectors 104 and the combined RF I/O connector 106 can function as an input port, an output port, or both. Therefore, the combined RF I/O connector 106 is alternatively referred to as "combined RF I/O port 106," and the RF band I/O connectors 104 are alternatively referred to, collectively, as "RF band I/O ports 104" and, individually, as "first RF band I/O port" 104-1, "second RF band I/O port" 104-2, . . . "Nth RF band I/O port" 104-N.

The first RF band I/O port 104-1 can couple to a RF/DC composite port (not separately numbered) of a first RF/DC separator 108-1. The first RF/DC separator 108-1 can include an RF port (not separately numbered) that couples to a first RF bandpass filter 110-1, and can include a separated DC first signal line, labeled DC-1, that connects to a DC sense logic 112. The first RF/DC separator 108-1 can be configured to receive at its RF/DC composite port a first input signal that can include a first RF signal, for wireless transmission by a first antenna (not visible in FIG. 1) at the distal end of the coaxial cable CX, and can include a DC first signal carrying DC first commands, for example, for steering the first antenna. The first RF/DC separator 108-1 can be configured to separate the first input signal into its components, outputting the separated first RF signal from the first RF/DC separator RF port to the first RF bandpass filter 110-1, and outputting the DC first signal (if any) to the first RF/DC separator DC signal line DC-1 for input to the DC sense logic 112.

The assignable DC port CBD 100 can include a similarly configured second RF/DC separator 108-2, . . . , Nth RF/DC separator 108-N, each configured as described for the first RF/DC separator 108-1. More specifically, the second RF/DC separator 108-2 RF/DC composite port (not separately numbered) can couple to the second RF band I/O port 104-2. From the second RF band I/O port 104-2, the second RF/DC separator 108-2 can receive a second input signal including a second RF signal, which can be for wireless transmission by a second antenna (not visible in FIG. 1) at the distal end of the coaxial cable CX, and can include a DC second signal carrying DC second commands, for example, for steering the second antenna. The second RF/DC separator 108-2 can separate the second input signal into its components, namely, second RF which it outputs from a second RF/DC separator RF port (not separately numbered) to a second RF bandpass filter 110-2, and a DC second signal, which it outputs (if present) to the second RF/DC separator DC signal line DC-2 for input to the DC sense logic 112. The Nth RF/DC separator 108-N RF/DC composite port (not separately numbered) can couple to the Nth RF band I/O port 104-N. From the Nth RF band I/O port 104-N, the Nth RF/DC separator 108-N can receive an Nth input signal including an Nth RF signal, and a DC Nth signal, carrying DC Nth commands, for example, for steering an Nth antenna. The Nth RF/DC separator 108-N can separate this Nth input signal and output the resulting Nth RF from an Nth RF/DC separator RF port (not separately numbered) to an Nth RF bandpass filter 108-N, and output from its Nth RF/DC separator DC signal line DC-N the DC Nth signal (if any) for input to the DC sense logic 112.

Referring again to FIG. 1, the respective I/Os (not separately numbered) of the first RF bandpass filter 110-1, second RF bandpass filter 110-2, . . . , Nth RF bandpass filter 110-N (collectively "RF bandpass filters" 110) can couple on one side (e.g., the lower edge of the blocks 110 on FIG. 1) to the RF/DC separators 108, and couple on the other side (e.g., the upper edge of the blocks 110 on FIG. 1), to N ports (visible but not separately labeled) of an N:1 RF combiner/de-combiner 114 that, in turn, couples to the single combined RF I/O port 106. The combiner/de-combiner 114 can provide, for N RF signals, each entering a respective one of the N RF band I/O ports 104, an N:1 RF multiplexer onto the coaxial transmission line CX. In an aspect, the combiner/de-combiner 114 can also provide a de-combining of N RF signals received by the combined RF I/O port 106, from the coaxial transmission line CX, each onto one of the N RF band I/O ports 104.

The N:1 RF combiner/de-combiner 114 can be an adaptation of conventional N:1 RF N:1 combiner/de-combiner techniques. Persons of ordinary skill, upon reading this disclosure, can readily select from and adapt such techniques for practices in accordance with disclosed aspects and, therefore, further detailed description of structure of the N:1 RF combiner/de-combiner 114 is omitted except where incidental to illustrated examples or described operations. For example, the FIG. 1 example N:1 RF combiner/de-combiner 114 includes low band RF combiner/de-combiner 116 arranged in parallel with high band RF combiner/de-combiner 118, which couple through an RF combiner 120 to the combined RF I/O port 106. This configuration of the N:1 RF combiner/de-combiner 114 is only one example, and can be in implementing an N:1 RF combiner/de-combiner 114 for values of N that include, but are not limited to four.

Referring again to FIG. 1, the assignable DC port CBD 100 can include a controller 122 and, coupled to the controller 122, a local range transmitter/receiver ("local TX/RX") 124. The local TX/RX 124 can be configured to transmit and receive according to an established protocol, for example, Bluetooth, HaLow, ZigBee, ANT, Z-Wave, or DASH7. With respect to range and sensitivity of the local TX/RX 124, examples include but are not limited to a height of an antenna mast. One specific example is described in greater detail in reference to FIG. 3.

Regarding the controller 122, one or more implementations can include programmable computer logic (not explicitly visible in FIG. 1) coupled to memory hardware, with the logic and the memory being components of, or otherwise integral to the assignable DC port CBD 100, with computer executable instructions stored in the memory. Examples of such implementations are described in greater detail in reference to FIG. 9. In another exemplary implementation, controller 122 can be provided by a user's (e.g., a technician's) smart phone, notepad device, or laptop computer, wireless coupled, for example by a Bluetooth, HaLow, ZigBee, ANT, Z-Wave, or DASH link or a host-client WiFi connection, or hard-wire coupled (e.g., through a hard-wire USB link) to the DC sense logic 112 and to the local TX/RX 124. Another implementation of the controller 122 can include configuring the assignable DC port CBD 100 as a web controllable device, and configuring a remote computer with capability to access the web controllable assignable DC port CBD 100 and to perform described functionality of the controller 122, including sending DC port scan commands to, and receiving DC sense data from the DC sense logic 112 and communicating through the local TX/RX 124, as described in greater detail later. In one or more implementations of a web controllable assignable DC port CBD 100, the device 100 can include IEEE 802.11b/g/n interface to a WiFi station (not visible in FIG. 1) connected to the Internet over a physical layer such as optical fiber, digital subscriber line (DSL), or very small aperture terminal (VSAT) satellite link. In an example implementation, functionality of the WiFi station can be provided by a user's or technician's smart phone or notepad WiFi "hot spot" capability, with the smart phone or notepad being connected to the Internet over, for example, a cellular phone link. In another implementation of a web controllable assignable DC port CBD 100, an Ethernet or equivalent connection can be used instead of wireless, e.g., 802.11b/g/n.

Referring to FIG. 1, DC sense logic 112 can include an N:1 DC selector switch (not separately visible) that selects and couples one of the N DC signal lines DC-1, DC-2, . . . , DC-N to a DC communication line, labeled "DS." In an implementation, selection can be performed by the controller 122, via a command line, labeled "CMD," that can extend between the DC sense logic 112 and the controller 122. In an alternative limitation, the DC sense logic 112 can be configured to make the selection automatically when the DC signal on one of the N DC signal lines DC-1, DC-2, . . . , DC-N exceeds a given threshold and, associated with the selection, send the identity of the selected DC signal line to the controller 122 over the CMD line. In another implementation, selection of which of the DC signal lines DC-1, DC-2, . . . , DC-N couples to the DC communication line can be distributed function, for example, performed automatically by the DC sense logic 112 as described above, with the controller 122 being configured to override the DC sense logic 112 in response to certain events or conditions. For example, as described in greater detail later in this disclosure, implementations of the assignable DC port CBD 100 can include provision for a user to enter a selection of which of the N DC signal lines DC-1, DC-2, . . . , DC-N to connect to the DC communication line DS, e.g., by a graphical user interface (GUI) on the housing 102, or by a Bluetooth, HaLow, ZigBee, ANT, Z-Wave, or DASH7 connection through the local TX/RX 124.

Referring again to FIG. 1, the assignable DC port CBD 100 can include a coaxial cable interfacing RF/DC combiner 123, which can include an RF port coupled to the combined RF I/O port of the RF combiner 120, a DCS port configured to receive the DS line, and a combined RF/DC port configured to couple to a proximal end of a coaxial cable CX. In an aspect, the RF/DC combiner 123 can operate as a coaxial interfacing RF/DC separator with respect to signals received from the coaxial transmission line CX.

The RF I/O ports or connectors 104 and the combined RF I/O port or connector 106 can be implemented as off-the-shelf (OTS) RF co-axial connectors. Specific implementations can be selected from among a variety of types and sizes of OTS connectors commercially available from numerous RF connector vendors, using selection methods are not necessarily specific to the aspects of this disclosure, and can be readily performed by persons of ordinary skill in the art, having possession of this disclosure as of the earliest priority date of this application. Each of the N RF/DC separators 108-N and each of the N RF bandpass filters 110 can be implemented using OTS RF/DC separators and RF bandpass filters, respectively, readily selected and adapted by persons of ordinary skill having possession of this disclosure, as of the earliest priority date of this application.

Figure 2:
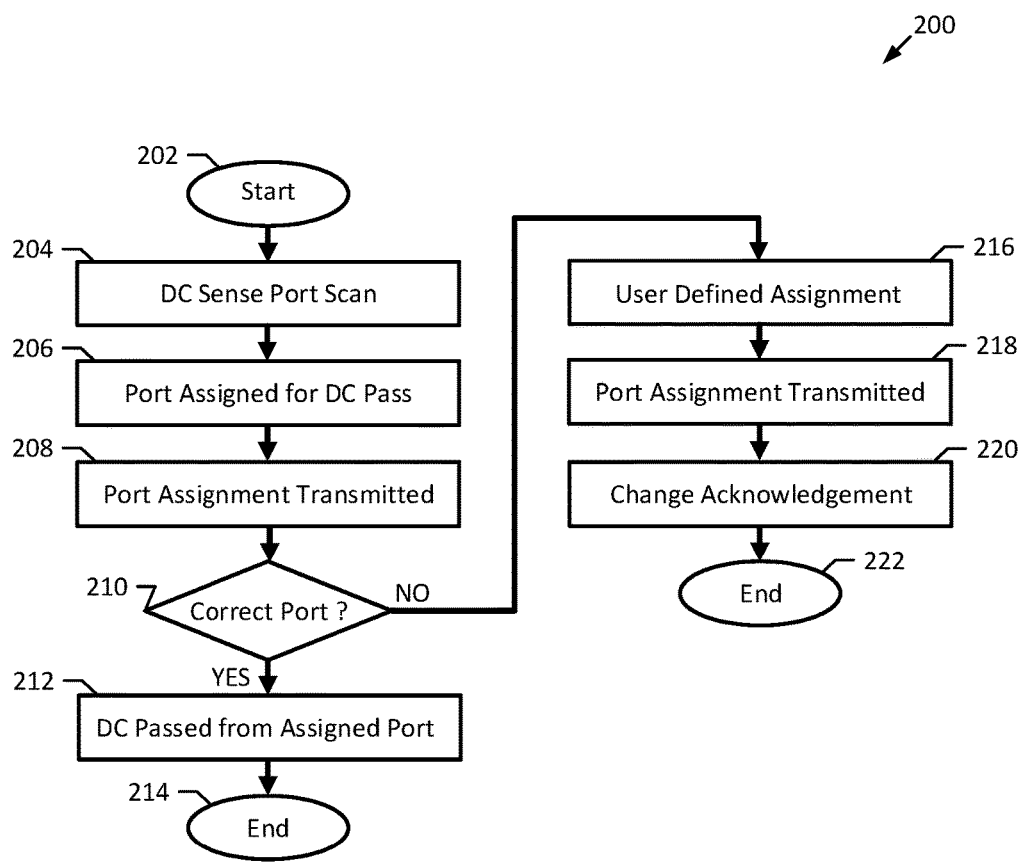
FIG. 2 illustrates one diagram of a flow of example operations in one of process of assigning a port of a DC multi-port, assignable DC pass I/O port CBD to be a DC pass I/O port, according to one or more aspects of this disclosure.

FIG. 2 illustrates one diagram 200 of a flow of example operations in one of process of assigning an RF I/O port of assignable DC pass I/O port CBD, such as the example described above in reference to FIG. 1, to be a DC pass RF I/O port, according to one or more aspects of this disclosure. The operations in the flow 200 can start at an arbitrary state 202 and then proceed to 204 to apply operations of scanning the N DC signal lines DC-1, DC-2, . . . , DC-N for carrying a DC current indicative of an antenna adjustment command, e.g., as a modulated DC signal, being received at any of the RF band I/O connectors 104. Operations at 204 can include, for example, the controller 122 initiating or causing the DC sense logic 112 to increment through the N DC signal lines DC-1, DC-2, . . . , DC-N, and compare DC current on each to a given threshold. In an aspect, the threshold can be set within a region of values that can keep false detections, for example due to noise, under a given maximum level, while also keeping failed detection percentage under a given maximum value. Regarding scheduling of scanning operations at 204, in an aspect, the controller 122 can be configured to periodically initiate or cause the DC sense logic 112 to perform the scan. In an example configuration, operations applied at 204 can include a continuous loop, from which an escape condition is detecting a DC current (e.g., meeting a threshold) being received through one of the RF I/O ports 104.

Upon a DC sense port scan at 204 detecting an above-threshold DC current on one of the N DC signal lines DC-1, DC-2, . . . , DC-N, the flow 200 can proceed to 206 and apply operations to assign that particular RF I/O port 104 to be the DC pass I/O port. Such operations can include, for example, the controller 122 sending a command, as described above, over the CMD link causing appropriate action by the N:1 DC selector switch in the DC sense logic 112. Referring to FIGS. 1 and 2, the DC signal on the assigned DC signal lines DC-1, DC-2, . . . , DC-N, can then be carried by the DC communication line DS and summed with the combined RF signal output from the combined RF I/O port 106, to be carried by the coaxial transmission line CX.

The flow 200 can then proceed to 208 and apply operations of transmitting the event of assigning the DC pass I/O port, and the identity of the newly assigned DC pass I/O port. Example operations at 208 can include the controller 122 causing the local TX/RX 124 to wireless transmit an "assigned DC channel" signal, labeled "DCA," e.g., via Bluetooth, HaLow, ZigBee, ANT, Z-Wave, or DASH7, or by WiFi, carrying this information. One entity receiving the signal can be another assignable DC I/O port CBD (e.g., identical to the FIG. 1 assignable DC port CBD 100, but not visible in that figure), or a device having a subset of the assignable DC port CBD 100 capabilities, as described in greater detail in reference to FIG. 3. For example, as will be described, the entity receiving the wireless DCA signal can be the entity at the distal end of the coaxial transmission line CX that receives the DC signal from the DC communication line DS summed with the combined RF signal output from the combined RF I/O port 106. In an aspect, after that entity separates the DC signal from the combined RF signal, it can use the DCA signal to route the separated DC signal to one of its N I/O connectors (not visible in FIGS. 1 and 2) for delivery to a corresponding antenna actuator.

Operations at 206 of selecting one of the N DC signal lines DC-1, DC-2, . . . , DC-N and making corresponding assignment of one of the RF I/O ports 104 to be the DC pass I/O port, can be in response, for example, to a technician inserting a DC power, or a DC command signal into one of the RF I/O ports 104. However, an error may have occurred, for example, in the detection at 204 or elsewhere such that the assignment at 206 was not to the correct one of the RF I/O ports 104. Therefore, after the assignment at 208 and wireless transmitting DCA identifying the DC pass I/O port, the flow can proceed to 210 and apply operations of determining if the assignment at 206 was to the correct one of the RF I/O ports 104. Assuming the determination at 210 is that the assignment at 206 was correct, the flow 200 can proceed to 212 where a desired DC power or DC command, or both, can be input to the assigned DC pass I/O port among the RF I/O ports 104. Operations at 212 can be associated, for example, with a technician adjusting an antenna at the distal end of the coaxial transmission line CX. Upon completion of such operations indicated, for example, by receipt of an external "completed" or "finished" command, the flow can proceed to 214 and end.

Referring to FIG. 2, the above-described operations at 212 and 214 assumed it was determined at 210 that the assignment at 206 was to the correct RF I/O port 104 of the assignable DC port CBD 100. If it is determined at 210 that the incorrect RF I/O port 104 had been assigned as the DC pass I/O port, the flow 200 can proceed to 216, and receive user-defined assignment instructions. The flow 200 can then apply assignment operations, e.g., assign a specified one of the RF I/O ports 104 as the DC pass I/O port. The specified one can be, for example, the RF I/O port 104 to which the user has connected antenna adjustment equipment sending the DC power and adjustment commands. The flow 200 can then proceed to 218 and transmit another DCA signal that gives notice of the assignment, as described above in reference to 208. After transmitting at 218, the flow 200 can proceed to 220 and apply operations of change acknowledgment, and then to 222 to end. Operations of "change acknowledgment" at 220 can be as follow: If user defined assignments are received at 216, the change acknowledgement 220 can include sending a signal or other acknowledgement to the user that the user-defined DC port was changed successfully with no issues. The sending can be, for example, by a Bluetooth, HaLow, ZigBee, ANT, Z-Wave, or DASH7, or WiFi transmission from the local TX/RX 124.

It will be appreciated that the above-described assignable DC port CBD 100, performing operations according to the flow 200 can provide a method that include receiving signals at each of a plurality of input ports, such as the N RF I/O ports 104, combining the signals into a combination signal, for example by operation of the N:1 combiner 114, and transmitting the combination signal over the coaxial line CX to a receiver. Method can also include the DC sense logic 112 detecting a DC entering one of the input ports, e.g., one of the RF I/O ports 104, and assigning the input port in which DC current was detected as an assigned DC I/O port. As will be described in greater detail, methods can include wireless transmitting to the receiver an identity, e.g., DCA, of the assigned DC I/O port, separating at the receiver a DC current from the combined signals received over the coaxial transmission line CX, and based on the wireless transmitted identity of the assigned DC I/O port, and routing at the receiver the separated DC current to a receiver I/O port corresponding to the identity of the assigned DC I/O port.

Figure 3:
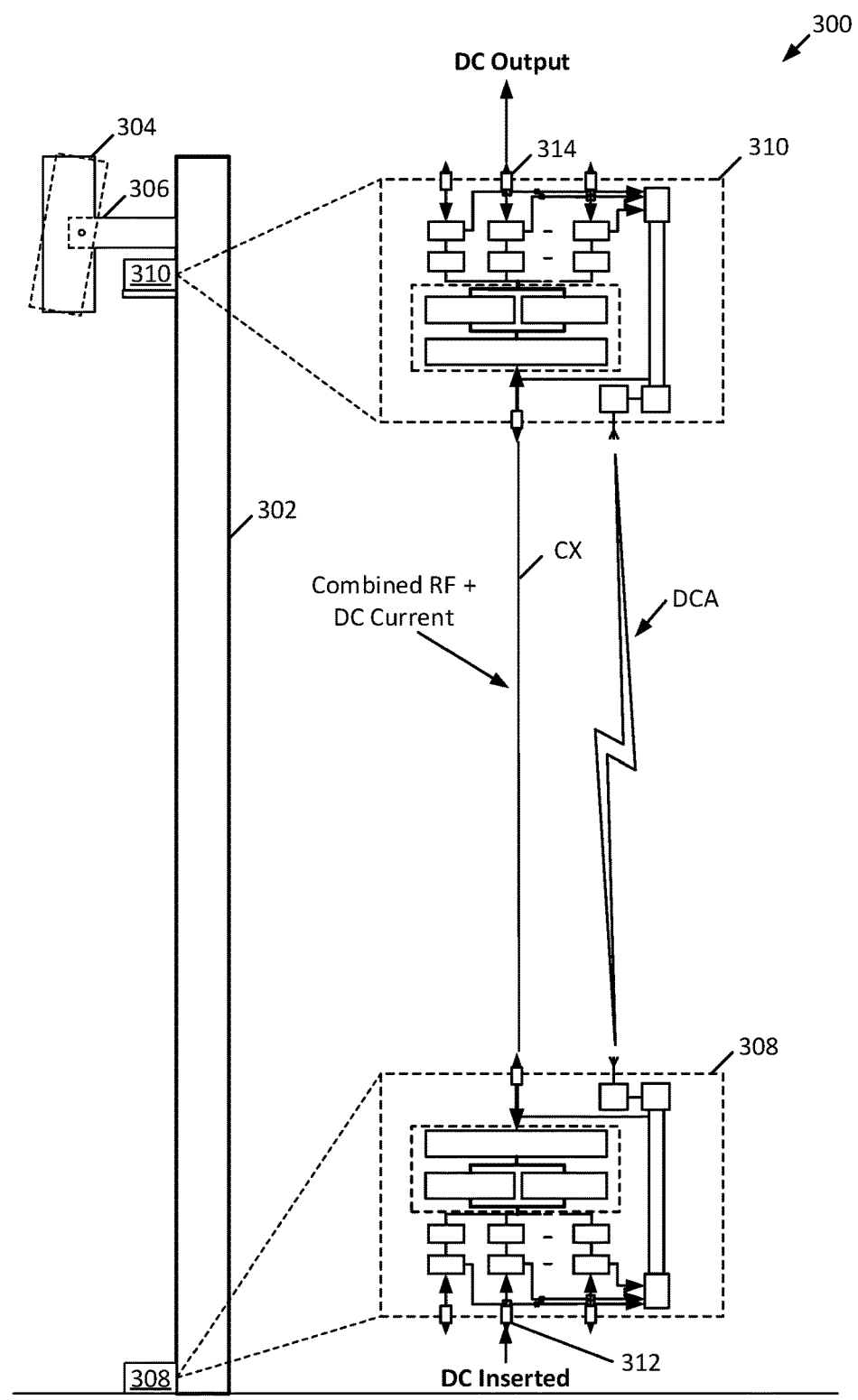
FIG. 3 illustrates a diagram of a masted, steerable antenna system, including assignable DC pass I/O port CBDs according to one or more aspects of this disclosure.

FIG. 3 illustrates a diagram 300 of a masted, steerable antenna system, including an antenna mast 302, an antenna 304 mounted at an upper elevation of the mast 302 by a motor actuated steerable mount 306, a first assignable DC I/O port CBD 308 installed proximal to the base of the antenna mast 302, and a second assignable DC I/O port CBD 310 installed proximal to the motor actuated steerable mount 306. Implementations within the meaning of block diagram 300 will be referenced as "system 300." The FIG. 3 example configuration shows the actuated steerable mount 306 as including mechanical tilt adjustment, as illustrated by the dotted-line rotated position of the antenna 304. However, tilt is only an arbitrary example, and is not intended to limit the scope of implementations according to this disclosure. For example, azimuth and height adjustments are also contemplated. In addition, in place of or in addition to the actuated steerable mount 306, an RET actuator (not visible in FIG. 3) can be included in the antenna 304.

For purposes of this description it will be assumed that the first assignable DC I/O port CBD 308 can be identical to the assignable DC port CBD 100 described above, or that it includes equivalent functionality sufficient, for example, to perform according to the above-described flow 200. In one or more implementations, the second assignable DC I/O port CBD 310 can also be assumed identical to the assignable DC port CBD 100 described above, or to include comparable functionality and structures. In one or more implementations, though, certain functionality and structure of the above-described assignable DC port CBD 100 can be omitted from the second assignable DC I/O port CBD 310, when installed in a co-operative arrangement with the first assignable DC I/O port CBD 308. For example, in an implementation, the second assignable DC I/O port CBD 310 may omit the above-described DC sense functionality of the DC Sense logic 312.

Certain example operations are described in reference to, or as being performed by the FIG. 1 controller 122. As described above, the controller 122 can be provided by a technician's smart phone, notepad device, or laptop computer, configured to perform the above-described controller 122 functions, for example, sending DC port scan commands to, and receiving DC sense data from the DC sense logic 112 and communicating through the local TX/RX 124, with the first assignable DC I/O port CBD 308 and the technician's device being wireless coupled, for example, by a Bluetooth, HaLow, ZigBee, ANT, Z-Wave, or DASH link or a host-client WiFi connection. Another implementation of the controller 122 can include configuring the first assignable DC I/O port CBD 308 with a hard wire connection, for example, a Universal Serial Bus (USB) connector connected through a USB cable to a laptop or other portable computer (not visible in FIG. 3) with capability to access the web controllable first assignable DC I/O port CBD 308, and to perform above-described functionality of the controller 122, for example, sending DC port scan commands to, and receiving DC sense data from the DC sense logic 112 and communicating through the local TX/RX 124. Another implementation of the controller 122 can include configuring the first assignable DC I/O port CBD 308 as a web controllable device, and configuring a remote computer (not visible in FIG. 3) with capability to access the web controllable first assignable DC I/O port CBD 308, and to perform above-described functionality of the controller 122, which includes, for example, sending DC port scan commands to, and receiving DC sense data from the DC sense logic 112 and communicating through the local TX/RX 124.

In another example implementation of a web controllable first assignable DC I/O port CBD 308, the device 308 can include IEEE 802.11b/g/n interface to a WiFi station (not visible in FIG. 3) connected to the Internet over a physical layer such as optical fiber, DSL, or VSAT satellite link. In an aspect, functionality of the WiFi station can be provided by a user's or technician's smart phone or notepad WiFi "hot spot" capability, with the smart phone or notepad being connected to the Internet over, for example, a cellular phone link. In another implementation of a web controllable assignable DC port CBD 100, an Ethernet or equivalent connection can be used instead of wireless, e.g., 802.11b/g/n. In such an implementation, the first assignable DC I/O port CBD 308 can include an Ethernet or equivalent connector (not visible in FIG. 3), for example, on its housing 102.

Referring to FIG. 3, example operations of the system 300 can include the first assignable DC I/O port CBD 308, applying a process such as described in reference to FIGS. 1 and 2, assigning a DC I/O port, wireless transmitting DCA identifying that assignment to the second assignable DC I/O port CBD 310, and the second assignable DC I/O port CBD 310 responding by mirroring the assignment. As described above in reference to FIG. 1, transmitting DCA can be short range protocol, such as but not limited to Bluetooth, HaLow, ZigBee, ANT, Z-Wave, or DASH7. Alternatively, the content of the transmission 314 can be communicated to the second assignable DC I/O port CBD 308 through a WiFi connection. The assignment at the first assignable DC I/O port CBD 308 can be a setting of the N:1 DC selector switch in the DC sense logic 112. As described above, this can be automatically performed by the DC Sense logic 112, or by controller 122, or both, for example, in response to a technician inserting DC power or DC commands or both into one of the RF I/O ports 104 of the first assignable DC I/O port CBD 308. The assignment at the second assignable DC I/O port CBD 310, in response to receiving the wireless DCA, can be performed by its controller setting its own N:1 DC selector switch (not explicitly visible in FIG. 3)—in the 1:N direction—to mirror the setting of the N:1 DC selector switch in the DC Sense logic 112. The N:1 DC selector switch of the second assignable DC I/O port CBD 310 can feed a respective DC separation line (not explicitly visible in FIG. 3) of each of N RF/DC separators (not explicitly visible in FIG. 3), arranged such as the N RF/DC separators 108 described in reference to FIG. 1 but operating as DC-RF combiners in the second assignable DC I/O port CBD 310.

When the N:1 DC selector switch of the second assignable DC I/O port CBD 310 is switched, by operations in response to receiving the wireless DCA transmission, to mirror the setting of the first device 308 N:1 DC selector switch of its DC Sense logic 112, the second device 308 feeds the DC current to only the DC separation line of the one of its RF/DC separator that is connected to the one of its N RF I/O ports that mirrors the DC I/O port 312, which is labeled "314" in FIG. 3.

Example operations of the system 300 will be described referring to the FIG. 1 example to identify structure or features performing the operations. FIG. 1 reference numbers are used in this description, and refer to blocks that appear in scaled-down size in FIG. 3. However, due to the scaling FIG. 3 does not show all the FIG. 1 numbers.

Operations in one example process on system 300 can include inserting DC power or DC commands, or both, into one of the RF I/O ports 104 of the first assignable DC I/O port CBD 308, such as the arbitrary example 312. It will be assumed that the inserted DC current is above the detection threshold of the DC Sense logic 112 of the first assignable DC I/O port CBD 308. After a delay, for example, arising from a scanning schedule of the DC Sense logic 112, the logic 112 detects the inserted current, and identifies the DC I/O port 312 as receiving the current. The detection can be an example of the above-described detection by the DC Sense Port Scan operations at FIG. 2 block 204. In response, the DC Sense logic 112, or controller 122, or both, of the first assignable DC I/O port CBD 308 can set the logic 112 N:1 DC selector switch to I/O port 312. The controller 122 of the first assignable DC I/O port CBD 308 can control the device 308's Local TX/RX 124 to transmit an assignment notice, with DCA identifying the I/O port 312 as the assigned DC I/O port. As described above in reference to FIG. 1, the transmission 314 can be short range protocol, such as Bluetooth, HaLow, ZigBee, ANT, Z-Wave, or DASH7. Alternatively, the content of the transmission 314 can be communicated to the second assignable DC I/O port CBD 308 through a WiFi connection. These transmission operations can be an example of the above-described assignment transmission operations at 208 of the flow 200.

The Local TX/RX (visible in FIG. 3 but separately numbered) of the second assignable DC I/O port CBD 310, upon receiving the wireless transmission 314 identifying the DC I/O port 320, can communicate the assignment to its controller (visible in FIG. 3 but not separately numbered). The controller of the second assignable DC I/O port CBD 310 can, in response to receiving the wireless transmitted DCA, switch its 1:N DC selector switch to a state mirroring the above-described N:1 DC selector switch selection of RF I/O port 312. Upon the selection, DC current (i.e., power or commands or both) is inserted into the selected DC I/O port 312 (which is one of the RF I/O ports 104) of the first assignable DC I/O port CBD 308. The N:1 selector switch of the DC Sense logic 112 of device 308 adds the current from DC I/O port 312 to the combined RF signal leaving its combined RF I/O port 106, and transmits these as "Combined RF+DC" to the second DC I/O port CBD 310. The second DC I/O port CBD 310, having its N:1 DC selector switch counterpart to the N:1 switch of the DC Sense logic 112 set to a mirror position, routes the DC current to only one of its RF I/O ports, namely, the one that mirrors DC I/O port 312, labeled in FIG. 3 as port 316.

The technician can then insert DC power and DC commands into the DC I/O port 312 to cause actuation of motors connected to port 316 of the second DC I/O port CBD 310. The technician can then move the test and adjustment equipment to another one of the RF I/O ports 104 of the first DC I/O port CBD 308, and repeat the above-described process. At each repeat, the first DC I/O port CBD 308 detects which of the RF I/O ports 104 is being used to inject DC current, assigns that as the DC I/O port, wireless transmits the assignment to the second DC I/O port CBD 310 which, in turns, selects the appropriate one of its RF I/O ports for outputting the DC current. It will be appreciated by persons of ordinary skill in the art, upon reading this description, that the disclosed technical features can provide, for example, solutions to problems of antenna adjustments requiring repeated, costly, climbs of antenna masts.

As described above, a technician can insert DC commands or current into the DC port assigned and provided by systems and methods according to this disclosure. According to one or more implementations, a DC command and current generator (not visible in the figures) can be included in the assignable DC port CBD 100, and the network associated with the radios connected to the FIG. 1 RF band I/O connectors 104 can include a self-optimizing network (SON) capability based on data analytics, and the SON can be configured to send, autonomously, adjustment commands to each of plurality of assignable DC port CBDs 100, or first DC I/O port CBDs 308, associated with a plurality of antenna masts. For each mast, the received autonomous adjustment commands can identify which of the antennas to be adjusted and, in response, the DC command and current generator can inject a DC current into the RF band I/O connector 104 that corresponds to that antenna. The DC sense logic 112 can then detect that RF band I/O connector 104 carrying the DC current and, in response, invoke an assignment process such as described in reference to FIG. 2 or in reference to FIG. 3.

Figure 4:
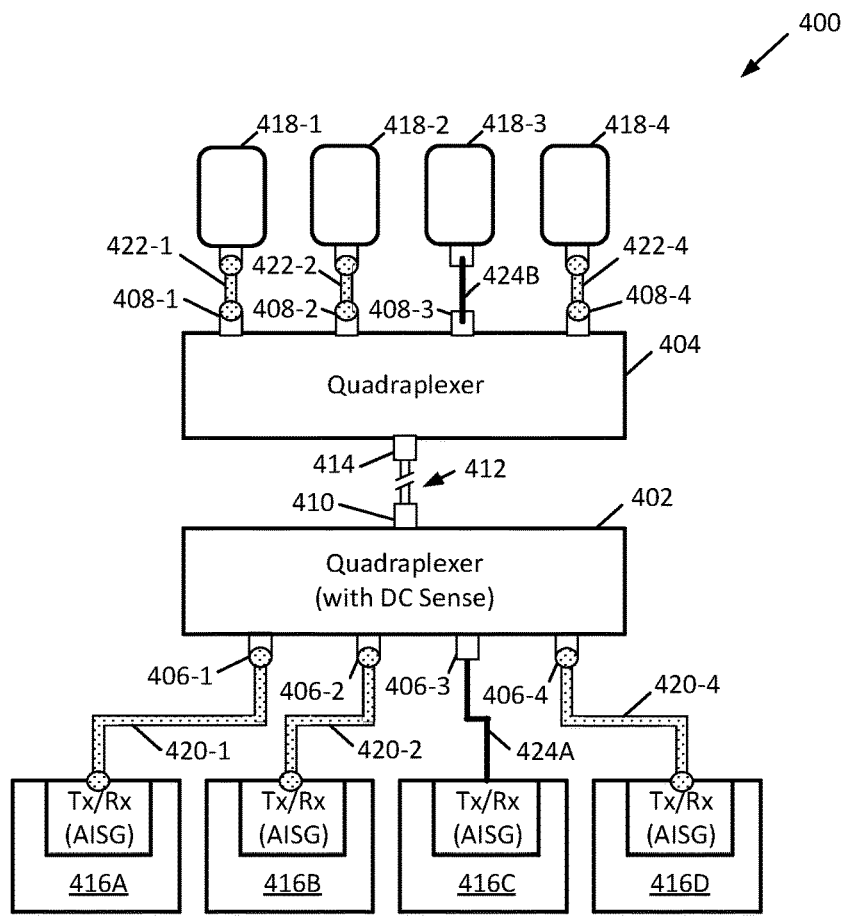
FIG. 4 illustrates a diagram representing one example configuration of a multi-port jumper-blocked CBD according to various aspects of this disclosure.

FIG. 4 illustrates a diagram 400 representing one example configuration of a multi-port jumper-blocked CBD feed system according to various aspects of this disclosure. Implementations within the meaning of the diagram 400 will be referenced as "jumper-blocked CBD system 400."

Referring to FIG. 4, the jumper-blocked CBD system 400 is described assuming an installation where a first quadraplexer 402 is installed proximal to a base of an antenna mast (not visible in FIG. 4) and a second quadraplexer 404 is installed at an elevated position on the antenna mast. The first quadraplexer 402 can include four first quadraplexer I/O ports, such as the example first quadraplexer first I/O port 406-1, first quadraplexer second I/O port 406-2, first quadraplexer third I/O port 406-3, and first quadraplexer fourth I/O port 406-4 (collectively "first I/O ports 406"). The second quadraplexer 404 can include four second quadraplexer I/O ports, such as the example second quadraplexer first I/O port 408-1, second quadraplexer second I/O port 408-2, second quadraplexer third I/O port 408-3, and second quadraplexer fourth I/O port 408-4 (collectively "second I/O ports 408"). The first quadraplexer 402 can include a combined I/O port 410 that can couple, through a coaxial cable 412, to a combined I/O port 414 of the second quadraplexer 404.

The jumper-blocked CBD system 400 can include, corresponding to the first I/O ports 406, a first radio 416-1, second radio 416-2, third radio 416-3, and fourth radio 416-4 (collectively "radios 416"). Each of the radios 416 can include a corresponding transmit/receive ("TX/RX") unit (visible in FIG. 4 but not separately labeled). The jumper-blocked CBD system 400 can include, corresponding to each of the second I/O ports 408, an antenna assembly, such as the example first antenna assembly 418-1 coupled to the second quadraplexer first I/O port 408-1, the second antenna assembly 418-2 coupled to the second quadraplexer second I/O port 408-2, the third antenna assembly 418-3 coupled to the second quadraplexer third I/O port 408-3, and the fourth antenna assembly 418-4 coupled to the second quadraplexer fourth I/O port 408-4. Each of these four antenna assemblies (418-1, 418-2, 418-3, and 418-4) can include (not visible in FIG. 4) an actuator-driven mount, or an internal RET actuator, or both.

FIG. 4 illustrates a specific configuration of the jumper-blocked CBD system 400 that provides a DC path from the first quadraplexer third I/O port 406-3, through the first quadraplexer 402 and the coaxial cable 412 to the second quadraplexer 404, and through the second quadraplexer 404 third I/O port 408-3 to the third antenna assembly 418-3. This example DC path provides for a technician to inject a DC command or power signal, or both, into the first quadraplexer third I/O port 406-3 for delivery to RET actuators within (or to movement actuators coupled to a mount for) the third antenna assembly 418-3. Persons of ordinary skill, upon reading this disclosure, can readily adapt the FIG. 4 example to a configuration providing the same DC path for any other I/O port of the first quadraplexer 402 to the corresponding I/O port of the second quadraplexer 404.

Referring to FIG. 4, the illustrated configuration includes a DC-block jumper 420-1 connecting the TX/RX unit of the first radio 416-1 to the first quadraplexer first I/O port 406-1, another DC-block jumper 420-2 connecting the TX/RX unit of the second radio 416-2 to the first quadraplexer second I/O port 406-2, and another DC-block jumper 420-4 connecting the TX/RX unit of the fourth radio 416-4 to the first quadraplexer fourth I/O port 406-4. In like manner, the illustrated configuration includes a DC-block jumper 422-1 connecting the second quadraplexer first I/O port 408-1 to the first antenna assembly 418-1, another DC-block jumper 422-2 connecting the second quadraplexer second I/O port 408-2 to the second antenna assembly 418-2, and a DC-block jumper 422-4 connecting the second quadraplexer fourth I/O port 408-4 to the fourth antenna assembly 418-4. The FIG. 4 illustrated configuration includes a first DC pass jumper 424A connecting the TX/RX unit of the third radio 416-3 to the first quadraplexer third I/O port 406-3, and a second DC pass jumper 424B connecting the second quadraplexer third I/O port 408-3 to the third antenna assembly 418-3.

Each of the DC-block jumpers 420-1, 420-2, 420-4 (collectively "DC-block jumpers 420") and each the DC-block jumpers 422-1, 422-2, 422-4 (collectively "DC-block jumpers 422") includes internal DC block structure that passes RF but does not pass DC. Example implementations for the DC-block jumpers 418 are described in reference to FIGS. 5, 6, and 7 respectively. As described in greater detail later, each of the three implementations prevents DC flow by replacing the inner conductor, the outer conductor, or both of a coaxial cable with a series of two segments coupled together at their ends by a capacitor. In contrast, the first DC pass jumper 424A and second DC pass jumper 424B can each carry RF and DC. The first DC pass jumper 424A and second DC pass jumper 424B can be implemented, for example, using conventional connection techniques.

Referring to FIG. 4, each the DC-block jumpers 420 and 422, irrespective which of implementation (i.e., FIG. 5, FIG. 6, or FIG. 7) include, at each distal end, a standard coaxial connector. Accordingly, implementations according to FIG. 4 provide DC block for all I/O ports 406 of the first quadraplexer 402 and all I/O ports 408 of the second quadraplexer 404 using the same number of connections required for ordinary, non-blocked connection. Conventional techniques, in contrast, may install, for each of the first quadraplexer 402 I/O ports 406-1, 406-2, and 406-4, a DC block device between that I/O port 406 and its normal connection (not visible in FIG. 4) to a corresponding one of the radios 416, and may install, for each of the second quadraplexer 404 I/O ports 408-1, 408-2, and 408-4, a DC block device between that I/O port 408 and its normal connection (not visible in FIG. 4) to a corresponding one of the antenna assemblies 418.

Figure 5:
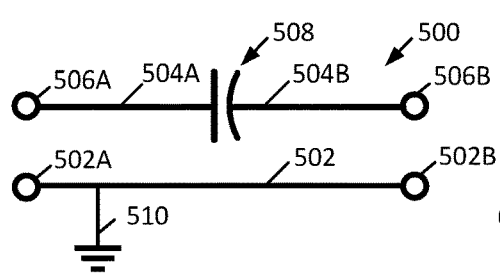
FIG. 5 illustrates a diagram of one circuit model of one inner-only DC block jumper, for the FIG. 4 multi-port jumper-blocked CBD according to various aspects of this disclosure.

FIG. 5 illustrates a diagram of one circuit model 500 of one inner-only DC block jumper, for the FIG. 4 jumper-blocked CBD according to various aspects of this disclosure.

Implementations within the meaning of the diagram 500 will be referenced as "inner-only DC block 500." An inner-only DC block 500 can include an outer conductor 502 of a coaxial cable, extending from an outer conductor first termination end 502A to an outer conductor second termination end 502B. The inner-only DC block 500 can include a capacitor-blocked inner conductor of the coaxial cable, formed for example of an inner conductor first segment 504A, extending from an inner conductor first segment termination end 506A to one plate of a capacitor 508, and coupled through the capacitor 508 to an inner conductor second segment 504B that extends from the other plate of the capacitor 508 to an inner conductor second segment termination end 506B. In an aspect, the outer conductor 502 can be grounded through ground element 510. The outer conductor first termination end 502A can couple to an outer conductor (not separately visible in FIG. 4) of an I/O port of the TX/RX unit of any of the radios 416. The outer conductor second termination end 502B can couple, for example, to an outer conductor of the first quadraplexer I/O ports. The inner conductor first segment termination end 506A can couple, for example, to an inner conductor of the any of the first quadraplexer I/O ports 406, and the inner conductor second segment termination end 506B can couple to an inner conductor (not separately visible in FIG. 4) of the I/O port of the TX/RX unit of any of the radios 416.

Figure 6:
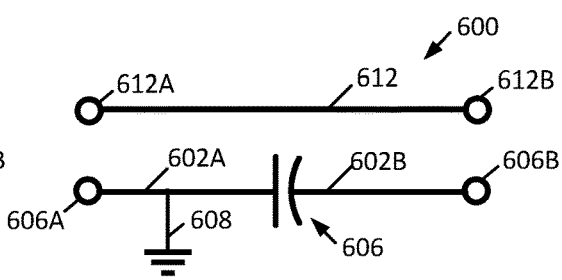
FIG. 6 illustrates a diagram of a circuit model of one outer-only DC block jumper, for the FIG. 4 multi-port jumper-blocked CBD according to various aspects of this disclosure.

FIG. 6 illustrates a diagram of one circuit model 600 of one outer-only DC block jumper, for the FIG. 4 jumper-blocked CBD according to various aspects of this disclosure. Implementations within the meaning of the diagram 600 will be referenced as "outer-only DC block 600." Referring to FIG. 6, an example outer-only DC block 600 can include an outer conductor first segment 602A, extending from an outer conductor first segment termination end 604A to one plate of a capacitor 606, and coupled through the capacitor 606 to an outer conductor second segment 602B that extends from the other plate of the capacitor 606 to an outer conductor second segment termination end 606B. The outer conductor first segment 602A in combination with the outer conductor second segment 602B provides a DC block jumper with a capacitor-blocked outer conductor. In an aspect, the outer conductor first segment 602A can be grounded through ground element 608. The outer-only DC block 600 can include an inner conductor 610, extending from an inner conductor first termination end 612A to an inner conductor second termination end 612B. The inner conductor first termination end 612A can couple, for example, to an inner conductor of the I/O port of the TX/RX unit of any of the radios 416. The inner conductor second termination end 612B can couple, for example, to an inner conductor of the any I/O port 406 of the first quadraplexer 402. The outer conductor first segment termination end 604A can couple, for example, to an outer conductor of the any I/O port 406 of the first quadraplexer 402, and the outer conductor second segment termination end 604B can couple to an outer conductor of the I/O port of the TX/RX unit of any of the radios 416.

Figure 7:
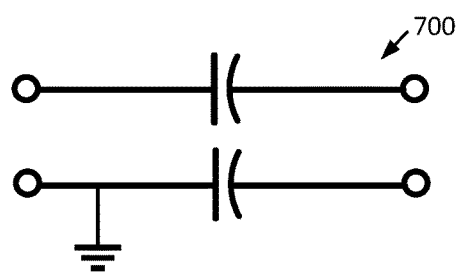
FIG. 7 illustrates a diagram of one circuit model of one inner-outer DC block jumper, for the FIG. 4 multi-port jumper-blocked CBD according to various aspects of this disclosure.

FIG. 7 illustrates a diagram 700 of one circuit model of one inner-outer DC block jumper, for the FIG. 4 multi-port jumper-blocked CBD according to various aspects of this disclosure. Implementations within the meaning of the diagram 700 will be referenced as "inner-outer DC block 700." It will be understood that an inner-outer DC block 700 is a superposition of the inner-only DC block 500 and the outer-only DC block 600. Therefore, structure and operation are described by overlaying FIGS. 5 and 6.

Figure 8:
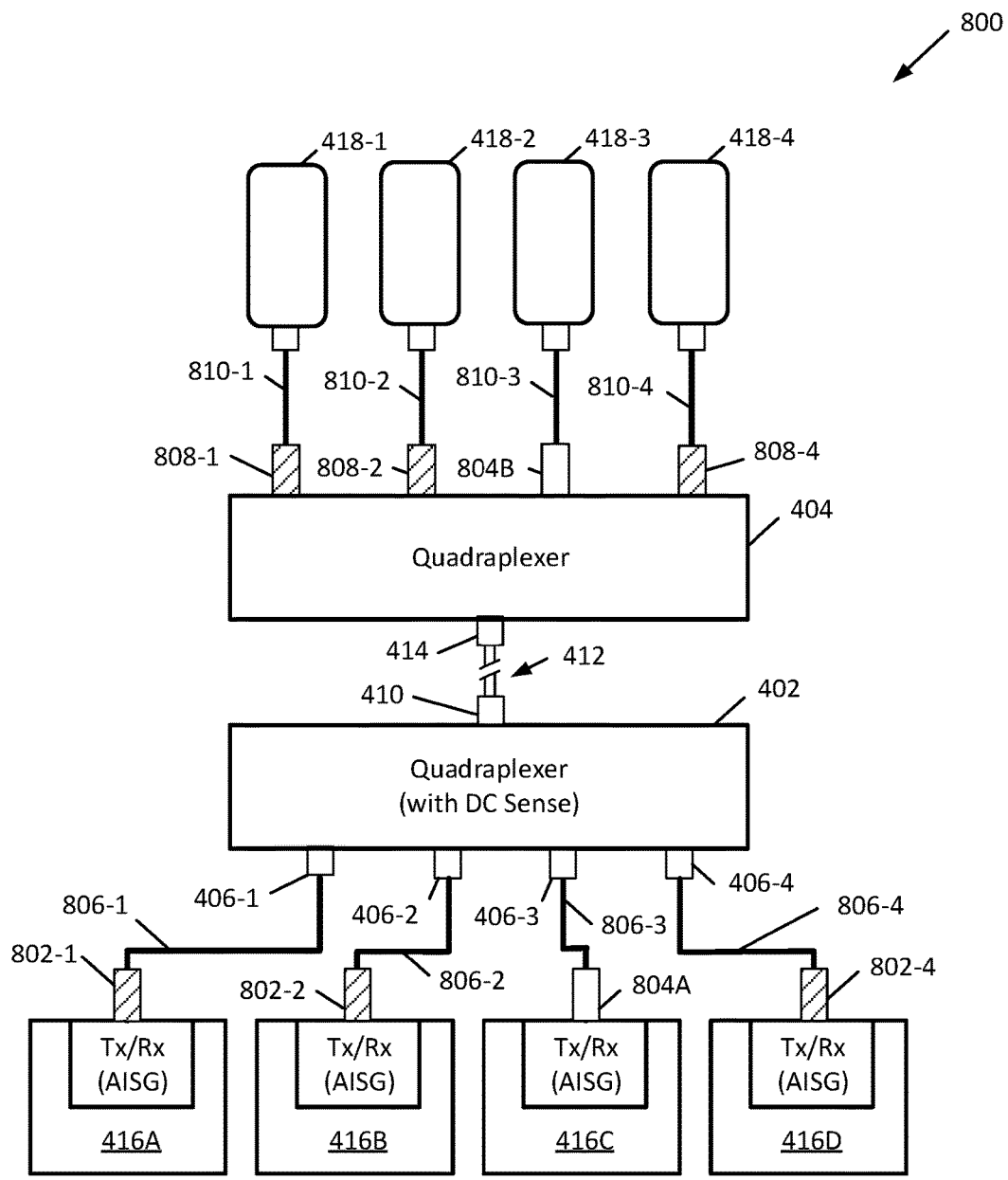
FIG. 8 illustrates a diagram representing one example configuration of a multi-port integrated connector DC blocked CBD according to various aspects of this disclosure.

FIGS. 4-7 illustrate DC block jumpers in which the DC block structure (e.g., according to FIG. 5, or 6, or 7) is incorporated. One alternative implementation can incorporate the above-described DC block features into a coaxial connector. FIG. 8 illustrates a diagram representing one example configuration of a multi-port integrated connector DC blocked CBD system 800 according to various aspects of this disclosure. FIG. 8 illustrates the multi-port integrated connector DC blocked CBD system 800 as a modification of the FIG. 4 multi-port integrated connector DC blocked CBD system 400, and therefore uses the FIG. 4 numbering for common items.

Referring to FIG. 8, the system 800 includes a DC-block coaxial cable connector 802-1, attached to one end of a first coaxial cable 806-1 and connected to the TX/RX unit of the first radio 416-1. The other end of the first coaxial cable 806-1 can be connected, for example, by a standard coaxial cable connector, to the first quadraplexer first I/O port 406-1. In an aspect, the DC-block coaxial cable connector 802-1 can include external structure according to a conventional coaxial cable connector, but with an inner conductor (not explicitly visible in FIG. 8) that instead of being continuous, has a structure that can be modeled electrically by the FIG. 5 inner conductor first segment 504A. The inner conductor structure of the DC-block coaxial cable connector 802-1 can extend from an inner conductor first segment termination end—which is connected to an inner conductor (not explicitly visible) of the first coaxial cable 806-1—to one plate of a capacitor (within the connector 802-1) corresponding to the capacitor 508. The inner conductor structure of the DC-block coaxial cable connector 802-1 can include the above-described structure corresponding to the FIG. 5 inner conductor first segment 504A coupled through the above-described capacitor to an inner conductor second segment, corresponding to the FIG. 5 inner conductor second segment 504B, and that extends from the other plate of the capacitor corresponding to 508 to an inner conductor second segment termination end, corresponding to 506B. The inner conductor second segment termination end can be structured according to a conventional inner conductor attachment end of a conventional coaxial cable connector.

Referring to FIG. 8, the system 800 can include another DC-block coaxial cable connector 802-2, attached to one end of a second coaxial cable 806-2, and connected to the TX/RX unit of the second radio 416-2. The other end of the second coaxial cable 806-2 can be connected, for example, by a standard coaxial cable connector, to the first quadraplexer second I/O port 406-2. The DC-block coaxial cable connector 802-2 can be structured as described above for the DC-block coaxial cable connector 802-1. The system 800 can include another DC-block coaxial cable connector 802-4, attached to one end of a fourth coaxial cable 806-4 and connected to the TX/RX unit of the fourth radio 416-4, with the other end of the fourth coaxial cable 806-4 being connected, for example, by a standard coaxial cable connector, to the first quadraplexer fourth I/O port 406-4.

The FIG. 8 system 800, in its illustrated configuration, can include a DC pass coaxial cable connector 804A, attached to one end of a third coaxial cable 806-3, and connected to the TX/RX unit of the third radio 416-3, with the other end of the third coaxial cable 806-3 being connected, for example, by a standard coaxial cable connector, to the first quadraplexer third I/O port 406-3. According to an aspect, the DC pass coaxial cable connector 804A can be implemented by a conventional technique coaxial cable connector.

The FIG. 8 system 800, in its illustrated configuration, can include a DC-block coaxial cable connector 808-1 attached to one end of a first antenna coaxial cable 810-1, and connected to a coaxial cable connector attachment (not separately numbered) coupled to the second quadraplexer first I/O port (obscured in FIG. 8 by the DC-block coaxial cable connector 808-1; labeled 408-1 in FIG. 4). The other end of the first antenna coaxial cable 810-1 can be connected, for example, by a standard coaxial cable connector, to the first antenna assembly 418-1. System 800 in its illustrated configuration can include another DC-block coaxial cable connector 808-2, attached to one end of a second antenna coaxial cable 810-2, and connected to a coaxial cable connector attachment (not separately visible) coupled to the second quadraplexer second I/O port (obscured in FIG. 8 by the DC-block coaxial cable connector 808-2; labeled 408-2 in FIG. 4). The other end of the second antenna coaxial cable 810-2 can be connected, for example by a standard coaxial cable connector, to the second antenna assembly 418-2. System 800, in its illustrated configuration, can include a DC-block coaxial cable connector 808-4, attached to one end of a fourth antenna coaxial cable 810-4, and connected to a coaxial cable connector attachment (not separately visible) coupled to the second quadraplexer fourth I/O port (obscured in FIG. 8 by the DC-block coaxial cable connector 808-4; labeled 408-4 in FIG. 4). The other end of the fourth antenna coaxial cable 810-4 can be connected, for example, by a standard coaxial cable connector, to the fourth antenna assembly 418-4.

The FIG. 8 system 800, in its illustrated configuration, can include another DC pass coaxial cable connector 804B attached to one end of a third antenna coaxial cable 810-3, and connected to a coaxial cable connector attachment (not separately numbered) coupled to the second quadraplexer third I/O port (obscured in FIG. 8 by the DC pass coaxial cable connector 804B; labeled 408-3 in FIG. 4). The other end of the third antenna coaxial cable 810-3 can be connected, for example by a standard coaxial cable connector, to the third antenna assembly 418-3. According to an aspect, the DC pass coaxial cable connector 804B can be implemented by a conventional technique coaxial cable connector.

Each of the DC-block coaxial cable connectors 802-1, 802-2, 802-4, (collectively "DC-block coaxial cable connectors 802") and each the DC-block coaxial cable connectors 808-1, 808-2, 808-4 (collectively "DC-block coaxial cable connectors 808") includes internal DC block structure (e.g., structure that can be modeled according to FIG. 5) that passes RF but does not pass DC. The DC pass coaxial cable connectors 804A and 804B, in contrast, each carry RF and DC.

Figure 9:
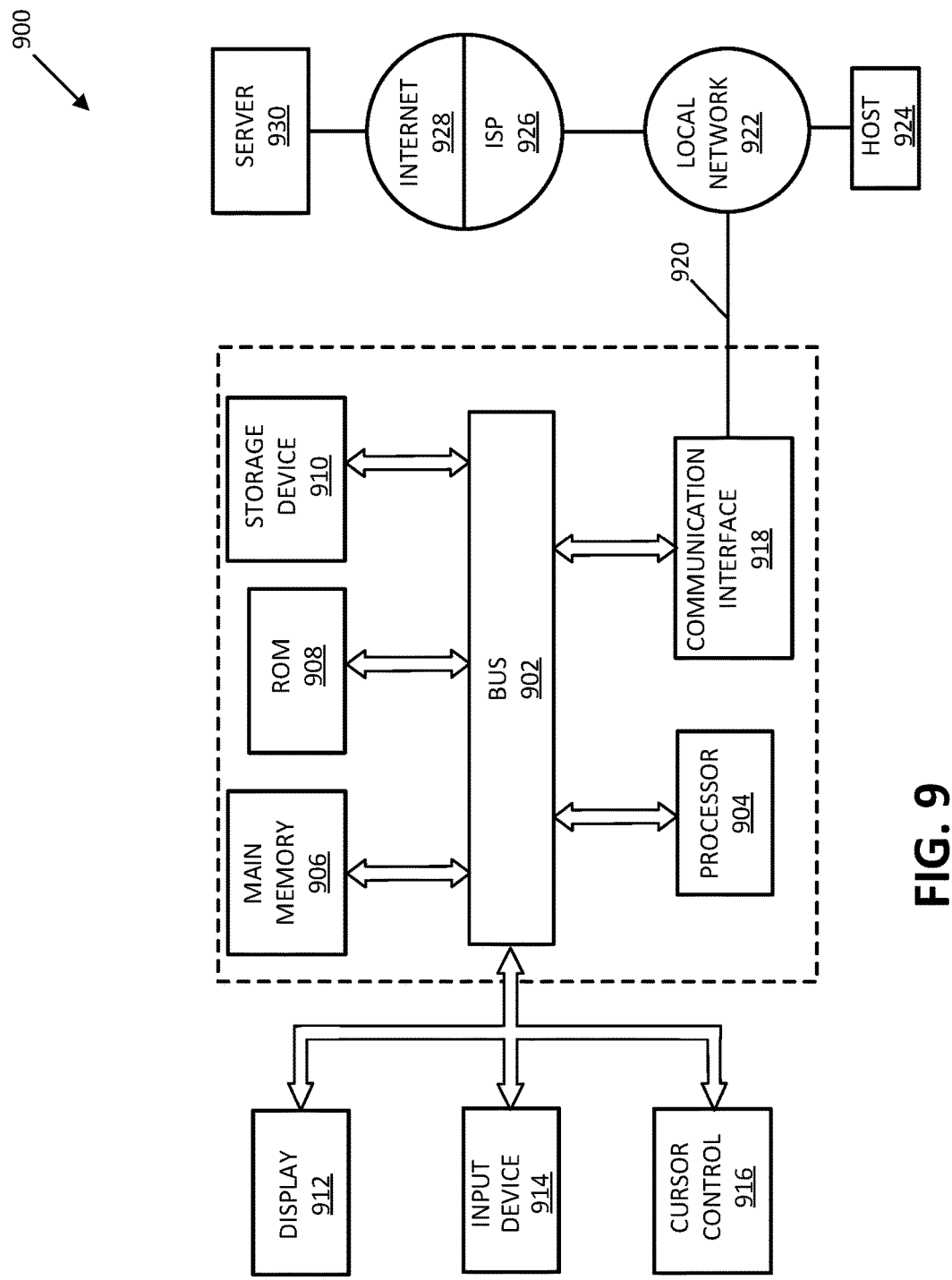
FIG. 9 illustrates a functional block diagram of one example implementation of a controller configured to provide various operations and features systems and method of assigning DC I/O pass channels in a multi-port CBD, according to one more aspects of this disclosure.

FIG. 9 is a block diagram illustrating aspects of a computer system 900 upon which aspects of this disclosure may be implemented, including but not limited to the FIG. 1 controller block 122, and processes according to this disclosure of assigning DC I/O pass channels in a multi-port combiner/de-combiner, such as described in reference to FIGS. 2 and 3. Regarding the controller 122, as described above, one exemplary implementation of the controller 122 can include processing logic and memory hardware that are components of, or otherwise integral to the assignable DC port CBD 100. Such an implementation can be according to the computer system 800. In another exemplary implementation, also described above, functionality of the controller 122 can be provided by a user's (e.g., a technician's) smart phone, notepad device, or laptop computer, coupled by a short range protocol link, for example Bluetooth, HaLow, ZigBee, ANT, Z-Wave, or DASH7, or coupled by a cellular telephone link, or by a host-client WiFi connection to the DC sense logic 112 and to the local TX/RX 124. In such implementations, resources of the smart phone, notepad device, or laptop computer can implement functional blocks, defined and arranged with one another according to illustrated computer system 900.

Referring to FIG. 9, computer system 900 may include a bus 902 or other communication mechanism for communicating information, and a processor 904 coupled with bus 902, and configured to execute computer-executable instructions stored, for example, in a main memory 906. The main memory 906 can be implemented in, and distributed across various system memory resources accessible through the bus 902, including random access memory (RAM) or other types of dynamic storage device. Main memory 906 may be used for storing temporary variables or other intermediate information during execution of instructions by processor 904. Computer system 900 can also include a read only memory (ROM) 908 or other static storage device, and a storage device 910, such as a magnetic disk or optical disk, each coupled to bus 902 for storing static information and instructions for processor 904.

Computer system 900 may be coupled via bus 902 to a display 912, such as a liquid crystal display (LCD), for displaying information to a computer user. An input device 914, including alphanumeric and other keys, or a touch-screen (not separately visible in FIG. 9) can be coupled to bus 902 for communicating information and command selections to processor 904.

Processor 904 can be configured to execute one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 900, various machine-readable media are involved, for example, in providing instructions to processor 904 for execution. Such media can have various forms, including but not limited to, non-volatile media, volatile media, and transmission media. Non-volatile media can include, for example, optical or magnetic disks. Volatile media can include dynamic memory. Transmission media can include coaxial cables, copper wire and optical fiber, including conductors that implement bus 902. Transmission media can also take the form of acoustic or light waves, such as those generated during radio wave and infrared data communications. All such media must be tangible to enable the instructions carried by the media to be detected by a physical mechanism that reads the instructions into a machine. A cursor control 916, such as a mouse, a trackball, or cursor direction keys, can be included for communicating direction information and command selections to processor 904 and for controlling cursor movement on display 912. The cursor control 916 can provide two degrees of freedom in two axes, a first axis (e.g., x) and a second axis (e.g., y), that allows the device to specify positions in a plane.

Computer system 900 can include a communication interface 918 coupled to bus 902, to provide a two-way data communication coupling through a network link (visible, but not separately numbered) to a local network 922. Network link 920 can provide data communication through one or more networks to other data devices. Network link 920 may provide connection through local network 922 to a host computer 924 or to data equipment operated by an Internet Service Provider (ISP) 926 to access the "Internet" 928, and a server resource 930. Computer system 900 can send messages and receive data, including program code, through the network(s), network link 920 and communication interface 918. The received code can be executed by processor 904 as it is received, and/or stored in storage device 910, or other non-volatile storage for later execution. Computer system 900 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An apparatus comprising:
   a wireless transmitter;
   an N:1 radio frequency (RF) combiner, including N RF input/output (I/O) ports and a combined RF I/O port, N being an integer greater than one;
   N RF/DC separators, each including a separated RF port coupled to a corresponding one of the RF I/O ports of the N:1 RF combiner, and each RF/DC separator further including a composite signal input port and a separated DC signal line;
   a N:1 DC selector switch, having N DC I/O ports and a DC line coupling, each DC I/O port coupled to one of the separated DC signal lines, and the DC line I/O coupled to the N:1 RF combiner;
   a direct current (DC) sense logic configured to receive the plurality of separated DC signal lines and, based on a DC signal on one of the separated DC signal lines, to identify, as a DC I/O port, the RF I/O port corresponding to the one separated DC signal line;
   a controller coupled to the wireless transmitter, the DC sense logic, and to the N:1 DC selector switch, and configured to respond to the DC sense logic identifying the DC input port by causing
      the DC signal to combine with an output of the combined RF I/O port, including causing the N:1 DC selector switch to select and couple the one separated DC signal line, through the DC line coupling, to the combined RF I/O port, and
      the wireless transmitter to wireless transmit an identity of the DC I/O port.

2. The apparatus of claim 1, further comprising:
   a coaxial cable interfacing RF/DC combiner, including an RF port coupled to the combined RF I/O port, a DC port, and a combined RF/DC port configured to couple to a coaxial cable, wherein
   the DC port is coupled, through a DC line, to the DC line coupling of the N:1 DC selector switch.

3. The apparatus of claim 1, further comprising:
   a coaxial cable interfacing RF/DC combiner, including an RF port coupled to the combined RF I/O port, a DC port, and a combined RF/DC port configured to couple to a proximal end of a coaxial cable, and wherein the N:1 DC selector switch is associated with the DC sense logic, and the DC port is coupled, through a DC line, to the DC line coupling of the N:1 DC selector switch.

4. The apparatus of claim 3, wherein the controller is a first controller, and wherein the apparatus further comprises:
a coaxial interfacing RF/DC separator, including a combined RF/DC I/O port coupled to a distal end of the coaxial cable, and including a separated DC I/O port, and a separated RF I/O port; and
a wireless receiver, located proximal to the 1:N RF de-combiner, and configured to receive the wireless transmitted identity of the DC I/O port.

5. The apparatus of claim 4, further comprising:
a 1:N RF de-combiner, including a second combined RF I/O port that is coupled to the separate RF port of the coaxial interfacing RF/DC separator, and including N second RF I/O ports;
N RF/DC combiners, each including an RF I/O port coupled to a corresponding one of the N second RF I/O ports of the 1:N RF de-combiner, and each further including a composite signal output and a DC signal line;
a 1:N DC selector switch, configured to couple the separated DC I/O port of the coaxial interfacing RF/DC separator to the DC signal line of a selected one of the N RF/DC combiners; and
a second controller, coupled to the wireless receiver and configured to control the 1:N DC selector switch to select the selected one of the N RF/DC combiners based on the wireless transmitted identity of the DC I/O port.

6. The apparatus of claim 1, wherein
the controller is further configured to respond to the DC sense logic identifying the DC input port by
causing the DC signal to combine with an output of the combined RF I/O port,
assigning the identified RF I/O port as an assigned DC I/O port,
determining whether the assigned DC I/O port is a correctly or incorrectly assigned DC I/O port, and
upon determining the assigned DC I/O port is an incorrectly assigned DC I/O port, to receive a user input identifying an RF I/O port as a user-selected DC I/O port.

7. The apparatus of claim 6, wherein the controller is further configured to include:
upon determining the assigned DC I/O port is an incorrectly assigned DC I/O port, to
assign the user-selected DC I/O port as a new assigned DC I/O port, and
cause the wireless transmitter to wireless transmit an identity of the new assigned DC I/O port.

8. A method, comprising:
receiving signals at each of a plurality of input ports;
separating the received signals into a corresponding plurality of RF signals and, for each RF signal, a separated DC signal line;
detecting a direct current (DC) entering one of the input ports;
assigning the input port in which DC current was detected as an assigned DC input/output (I/O) port;
selecting, as a selected DC signal line from among the N separated DC signal lines, the separated DC signal line corresponding to the assigned DC I/O port;
combining the RF signals and a DC current on the selected DC signal line into a combination signal, and transmitting the combination signal over a coaxial line to a receiver;
wireless transmitting an identity of the assigned DC I/O port to the receiver;
separating, at the receiver, a DC current from the combination signal received over the coaxial transmission line; and
based on the wireless transmitted identity of the assigned DC I/O port, routing at the receiver the separated DC current to a receiver I/O port corresponding to the identity of the assigned DC I/O port.

9. The method of claim 8, further comprising:
determining whether the assigned DC I/O port is a correctly or incorrectly assigned DC I/O port, and
upon determining the assigned DC I/O port is an incorrectly assigned DC I/O port,
receiving a user input identifying an RF I/O port as a user-selected DC I/O port and,
in response to the user input, assigning the user-selected DC I/O port as a new assigned DC I/O port.

10. The method of claim 9, further comprising:
upon assigning the user-selected DC I/O port as a new assigned DC I/O port, wireless transmitting to the receiver an identity of the new assigned DC I/O port.

11. The method of claim 8, further comprising:
adjusting an antenna coupled to the receiver, the adjusting including
inserting an actuator DC current into the assigned DC I/O port; and
carrying the actuator DC current with the combination signal over the transmission line,
separating, at the receiver, the actuator DC current from the combination signals received over the coaxial transmission line,
routing at the receiver the separated actuator DC current to the receiver I/O port corresponding to the identity of the assigned DC I/O port, and
receiving the actuator current at an antenna actuator coupled to said receiver I/O port.

12. The method of claim 8, wherein the DC current on the selected DC signal line includes a DC command signal.

13. A method, comprising:
receiving N radio frequency (RF) outputs, each from a corresponding radio, at a corresponding N RF I/O ports, N being an integer greater than 1;
separating each of the N received RF outputs into a separated RF signal and a corresponding DC signal line;
combining the N RF signals into a combined RF signal and outputting the combined RF signal to a transmission line;
detecting a DC current entering one of N RF I/O ports and, in response,
selecting, as a selected DC signal line from among the N separated DC signal lines, the separated DC signal line corresponding to the one RF I/O port,
combining, into a combined RF/DC signal, a DC current from the selected DC signal line with the combined RF signal,
outputting the combined RF/DC signal to the transmission line, and
wireless transmitting an identity of the one RF I/O port.

14. The method of claim 13, further comprising:
receiving from the transmission line, at a receiver, the combined RF/DC signal;

receiving, at the receiver, the wireless transmitted identity of the one RF I/O port; and based on the received wireless transmitted identity of the one RF I/O port, separating at the receiver from the combined RF/DC signal the DC current from the selected DC signal line, and routing the separated DC current to an I/O port of the receiver corresponding to the one RF I/O port.

15. The method of claim 14, further comprising:

inserting a DC current into the I/O port assigned as the DC I/O port; and carrying the inserted DC current with the combined RF/DC signal over the transmission line.

16. The method of claim 14, further comprising:

separating the received N outputs into a corresponding N separated DC signal lines and N separated RF signals, wherein detecting a DC current entering the one I/O port is based on the N separated DC signal lines.

17. The method of claim 16, further comprising coupling the selected separated DC signal line carrying the DC signal to the combined RF I/O port.

18. The method of claim 17, further comprising:

assigning the identified RF I/O port as an assigned DC I/O port;

determining whether the assigned DC I/O port is a correctly or incorrectly assigned DC I/O port, and upon determining the assigned DC I/O port is an incorrectly assigned DC I/O port, receiving a user input identifying an RF I/O port as a user-selected DC I/O port and, in response to the user input, assigning the user-selected DC I/O port as a new assigned DC I/O port, and wireless transmitting an identity of the new assigned DC I/O port.

19. The method of claim 13, wherein the DC current from the selected DC signal line includes a DC command signal.

20. An apparatus comprising:

a wireless transmitter;

an N:1 radio frequency (RF) combiner, including N RF input/output (I/O) ports and a combined RF I/O port, N being an integer greater than one;

a direct current (DC) sense logic configured to identify, as a DC I/O port, one of the RF I/O ports receiving a DC signal; and a controller coupled to the wireless transmitter and to the DC sense logic, configured to respond to the DC sense logic identifying the DC input port by causing the DC signal to combine with an output of the combined RF I/O port, assigning the identified RF I/O port as an assigned DC I/O port, causing the wireless transmitter to wireless transmit an identity of the DC I/O port, determining whether the assigned DC I/O port is a correctly or incorrectly assigned DC I/O port, and upon determining the assigned DC I/O port is an incorrectly assigned DC I/O port, to receive a user input identifying an RF I/O port as a user-selected DC I/O port.

* * * * *